United States Patent
Takase (10) Patent No.: US 11,794,577 B2
(45) Date of Patent: Oct. 24, 2023

(54) WORK MACHINE AND CONTROL METHOD THEREOF

(71) Applicant: KOMATSU LTD., Tokyo (JP)

(72) Inventor: Naoto Takase, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/261,700

(22) PCT Filed: Oct. 18, 2019

(86) PCT No.: PCT/JP2019/041063
§ 371 (c)(1),
(2) Date: Jan. 20, 2021

(87) PCT Pub. No.: WO2020/085232
PCT Pub. Date: Apr. 30, 2020

(65) Prior Publication Data
US 2021/0291647 A1 Sep. 23, 2021

(30) Foreign Application Priority Data
Oct. 26, 2018 (JP) ................................. 2018-201552

(51) Int. Cl.
| B60K 17/16 | (2006.01) |
| B60K 23/04 | (2006.01) |
| B60K 28/10 | (2006.01) |
| B62D 12/00 | (2006.01) |
| E02F 3/84 | (2006.01) |

(52) U.S. Cl.
CPC .............. *B60K 23/04* (2013.01); *B60K 17/20* (2013.01); *B60K 28/10* (2013.01); *B62D 12/00* (2013.01); *E02F 3/841* (2013.01)

(58) Field of Classification Search
CPC ........ B60K 17/20; B60K 28/10; B60K 12/00; E02F 3/841; B62D 12/00
See application file for complete search history.

(56) References Cited

U.S. PATENT DOCUMENTS

| 5,301,768 A * | 4/1994 | Ishikawa ............... B60T 8/1769 |
| | | 180/197 |
| 5,685,386 A * | 11/1997 | Kondo .................... B60K 17/00 |
| | | 180/197 |
| 5,742,917 A * | 4/1998 | Matsuno ............... B60K 28/165 |
| | | 701/88 |
| 6,345,229 B1 * | 2/2002 | Honkomp ............... G01C 21/30 |
| | | 701/518 |
| 2002/0107628 A1 * | 8/2002 | Sakakiyama .......... B60K 23/08 |
| | | 180/197 |

(Continued)

FOREIGN PATENT DOCUMENTS

| CN | 101448666 A | 6/2009 |
| CN | 102138058 A | 7/2011 |

(Continued)

*Primary Examiner* — Frank B Vanaman
(74) *Attorney, Agent, or Firm* — Faegre Drinker Biddle & Reath LLP (57) ABSTRACT

The differential control device prohibits or limits a differential motion generated by the differential device. The sensor detects a turning angular velocity of the motor grader. Based on the turning angular velocity detected by the sensor, the controller controls the differential control device to perform the differential prohibition or limitation.

5 Claims, 5 Drawing Sheets

(56) References Cited

U.S. PATENT DOCUMENTS

| | | |
|---|---|---|
| 2007/0250236 A1 | 10/2007 | Newberry et al. |
| 2008/0135322 A1 | 6/2008 | Smith et al. |
| 2011/0246031 A1 | 10/2011 | Uematsu et al. |
| 2018/0134152 A1 | 5/2018 | Nagayama et al. |
| 2019/0047620 A1 | 2/2019 | Iwamura |

FOREIGN PATENT DOCUMENTS

| | | |
|---|---|---|
| CN | 107139924 A | 9/2017 |
| JP | H07-156681 A | 6/1995 |
| JP | 2003-237619 A | 8/2003 |
| JP | 2010-281402 A | 12/2010 |
| JP | 2017-140893 A | 8/2017 |
| JP | 2018-76949 A | 5/2018 |

\* cited by examiner

WORK MACHINE AND CONTROL METHOD THEREOF

TECHNICAL FIELD

The present disclosure relates to a work machine and a control method thereof.

BACKGROUND ART

Conventionally, there is known a motor grader that is provided with a manual differential locker locking/unlocking mode or an automatic differential locker locking/unlocking mode. Such motor grader is disclosed in, for example, US Patent Application Publication No. 2007/0250236 (PTL 1), US Patent Application Publication No. 2008/0135322 (PTL 2) and the like.

In the automatic differential locker locking/unlocking mode, whether or not the motor grader is turning is determined based on information from a front wheel steering angle sensor and information from an articulation angle sensor. When it is determined that the motor grader is travelling straight, the differential locker is locked, and when it is determined that the motor grader is turning, the differential locker is unlocked.

CITATION LIST

Patent Literature

[PTL 1]: US Patent Application Publication No. 2007/0250236
[PTL 2]: US Patent Application Publication No. 2008/0135322

SUMMARY OF INVENTION

Technical Problem

However, in the automatic differential locker locking/unlocking mode, if a rear wheel slips during the turning motion, the differential locker remains unlocked.

Therefore, the rear wheel cannot get out of the slippage unless the front wheel steering angle and the articulation angle are set to 0° (to cause the motor grader to travel straight) or the differential locker is manually locked.

Further, in the motor grader described in the patent documents mentioned above, since the front wheel steering angle sensor is disposed nearby the front wheel, it is likely to suffer from damage. In addition, since the articulation angle sensor is disposed nearby a connection portion between the front frame and the rear frame, it is likely to suffer from damage.

It is an object of the present disclosure to provide a work machine which is capable of easily getting out of the slippage even when a wheel slips during the turning motion and effectively protecting sensors from any possible damage, and a control method thereof.

Solution to Problem

A work machine of the present disclosure includes a differential device, a differential control device, a sensor, and a controller. The differential control device prohibits or limits a differential motion generated by the differential device. The sensor detects a turning angular velocity of the work machine. Based on the turning angular velocity detected by the sensor, the controller controls the differential control device to perform the differential prohibition or limitation.

According to the present disclosure, a control method of a work machine equipped with a right wheel and a left wheel includes the following steps.

A turning angular velocity of the work machine is detected. A differential motion between the right wheel and the left wheel is prohibited or limited based on the detected turning angular velocity of the work machine.

Advantageous Effects of Invention

According to the present disclosure, it is possible to provide a work machine which is capable of easily getting out of the slippage even when a wheel slips during the turning motion and effectively protecting sensors from any possible damage, and a control method thereof.

DESCRIPTION OF EMBODIMENTS

Hereinafter, a work machine according to an embodiment of the present disclosure will be described with reference to the drawings.

In the specification and the drawings, the same or corresponding components are denoted by the same reference numerals, and the description thereof will not be repeated. In the drawings, a configuration may be omitted or simplified for the convenience of explanation.

<Configuration of Motor Grader>

First, a description will be given on the configuration of a motor grader which serves as an example of a work machine to which the concept of the present disclosure is applied.

Figure 1:
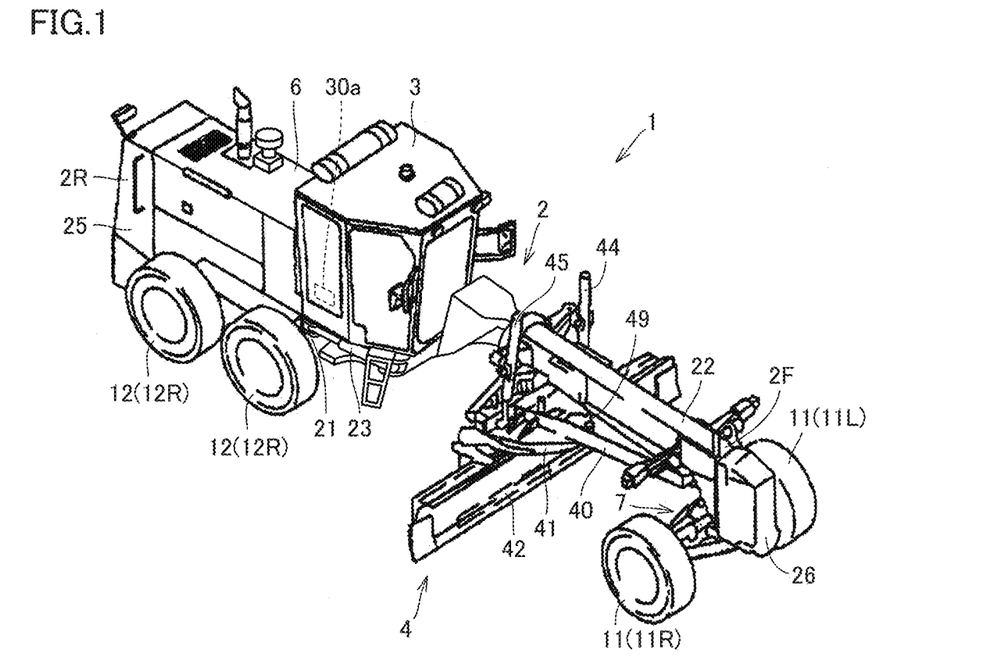
FIG. 1 is a perspective view schematically illustrating a configuration of a motor grader according to an embodiment.

FIG. 1 is a perspective view schematically illustrating the configuration of a motor grader according to an embodiment. As illustrated in FIG. 1, a motor grader 1 of the present embodiment mainly includes travelling wheels 11 and 12, a body frame 2, a cab 3, and a work implement 4. The motor grader 1 further includes components such as an engine disposed inside an engine compartment 6. The work implement 4 includes, for example, a blade 42. The motor grader 1 uses the blade 42 to carry out works such as land-leveling work, excavation work, snow-removing work, material-mixing work and the like.

In the following description of the drawings, a direction in which the motor grader 1 travels straight is defined as a front-rear direction of the motor grader 1. In the front-rear direction of the motor grader 1, a side where the front wheels 11 are arranged relative to the work implement 4 is defined as a front direction. In the front-rear direction of the motor grader 1, a side where the rear wheels 12 are arranged relative to the work implement 4 is defined as a rear direction. A left-right direction of the motor grader 1 is defined as a direction orthogonal to the front-rear direction in planar view. When viewing from the front direction, a direction toward the right side of the left-right direction and a direction toward the left side of the left-right direction are defined as a right direction and a left direction, respectively. A up-down direction of the motor grader 1 is defined as a direction orthogonal to a plane defined by the front-back direction and the left-right direction. In the up-down direction, the side downward the ground is defined as a lower side, and the side upward the sky is defined as an upper side.

The travelling wheels 11 and 12 includes front wheels 11 and rear wheels 12. The front wheels 11 includes a right front wheel 11R arranged on the right side and a left front wheel 11L arranged on the left side. The rear wheel 12 includes two right wheels 12R arranged on the right side and two left wheels 12L arranged on the left side (see FIG. 2). The number and the arrangement of the front wheels 11 and the rear wheels 12 are not limited to the example illustrated in FIG. 1.

The body frame 2 extends in the front-rear direction. The body frame 2 includes a rear frame 21 and a front frame 22.

The rear frame 21 supports an exterior cover 25 and components such as an engine disposed inside the engine compartment 6. The exterior cover 25 covers the engine compartment 6. For example, each of the four rear wheels 12 is attached to the rear frame 21. Each of the four rear wheels 12 may be driven to rotate by a driving force from the engine.

The front frame 22 is coupled to a front end of the rear frame 21. The front frame 22 is pivotably coupled to the rear frame 21. The front frame 22 extends in the front-rear direction. The front frame 22 includes a rear end coupled to the rear frame 21 and a front end opposite to the rear end. The rear end of the front frame 22 is coupled to the front end of the rear frame 21 by a vertical articulation pin 24 (see FIG. 2). The front frame 22 is formed of a single beam.

An articulation cylinder 23 is attached between the front frame 22 and the rear frame 21. The front frame 22 is configured to be pivoted (articulated) with respect to the rear frame 21 by the extension and retraction of the articulation cylinder 23.

For example, two front wheels 11 are rotatably attached to the front end of the front frame 22. The front wheels 11 are attached in such a manner that they may be turned with respect to the front frame 22 by the extension and retraction of a pair of steering cylinders 7. The motor grader 1 is configured to change its travelling direction by extending and retracting the pair of steering cylinders 7.

A counterweight 26 is attached to the front end 2F of the body frame 2. The counterweight 26 is one kind of attachments to be attached to the front frame 22. The counterweight 26 is attached to the front frame 22 to add a downward load to the front wheel 11 to enable easy steering and increase the pressing load on the blade 42.

The cab 3 is mounted on the rear frame 21, for example. The inside of the cab 3 is disposed with operation components (not shown) such as a steering wheel, a gear shift lever, operation levers for controlling the work implement 4, a brake, an accelerator pedal, and an inching pedal. The travelling wheels 11 and 12, the body frame 2 and the cab 3 constitute a vehicle body (machine body).

The work implement 4 mainly includes, for example, a draw bar 40, a swing circle 41, and a blade 42. The draw bar 40 is disposed below the front frame 22. The front end of the drawbar 40 is coupled to the front end of the front frame 22 by means of a ball bearing. The front end of the drawbar 40 is pivotally coupled to the front end of the front frame 22.

The rear end of the draw bar 40 is supported on the front frame 22 (a part of the vehicle body) by a pair of lift cylinders 44 and 45. The rear end of the drawbar 40 may be moved up and down with respect to the front frame 22 by the extension and retraction of the pair of lift cylinders 44 and 45. The draw bar 40 may be pivoted about an axis extending in the front-rear direction by the extension and retraction of the pair of lift cylinders 44 and 45.

The swing circle 41 is disposed below the front frame 22. The swing circle 41 is disposed below the draw bar 40. The swing circle 41 is pivotally (rotatably) attached to the rear end of the draw bar 40. The swing circle 41 may be driven by a hydraulic motor 49 so as to rotate in both the clockwise direction and the counterclockwise direction with respect to the draw bar 40 as viewed from the top of the vehicle. The blade 42 is disposed on the swing circle 41. The rotation of the swing circle 41 adjusts a blade angle of the blade 42. The blade angle is an inclination angle of the blade 42 with respect to the front-rear direction of the motor grader 1 when viewed from the top of the vehicle.

The blade 42 is disposed between the front wheels 11 and the rear wheels 12. The front wheels 11 are disposed in front of the blade 42. The rear wheels 12 are disposed rearward of the blade 42. The blade 42 is disposed between the front end 2F of the body frame 2 and the rear end 2R of the body frame 2. The blade 42 is supported on the swing circle 41. The blade 42 is supported on the draw bar 40 through the intermediary of the swing circle 41. The blade 42 is supported on the front frame 22 through the intermediary of the draw bar 40.

The pair of lift cylinders 44 and 45 is configured to hang (suspend) the draw bar 40 with respect to the vehicle body. Specifically, the pair of lift cylinders 44 and 45 supports the blade 42 located below the front frame 22 (a part of the vehicle body) through the intermediary of the draw bar 40. The position of the draw bar 40 and the blade 42 may be adjusted by expanding or contracting the pair of lift cylinders 44, 45.

As described above, through the intermediary of the drawbar 40 and the swing circle 41, the blade 42 is allowed to move up and down with respect to the vehicle and to swing about an axis extending in the front-rear direction.

<Drive Control Configuration of Travelling Wheels of Motor Grader>

Next, a drive control configuration of the travelling wheels (the rear wheels 12) of the motor grader 1 will be described with reference to FIG. 2.

Figure 2:
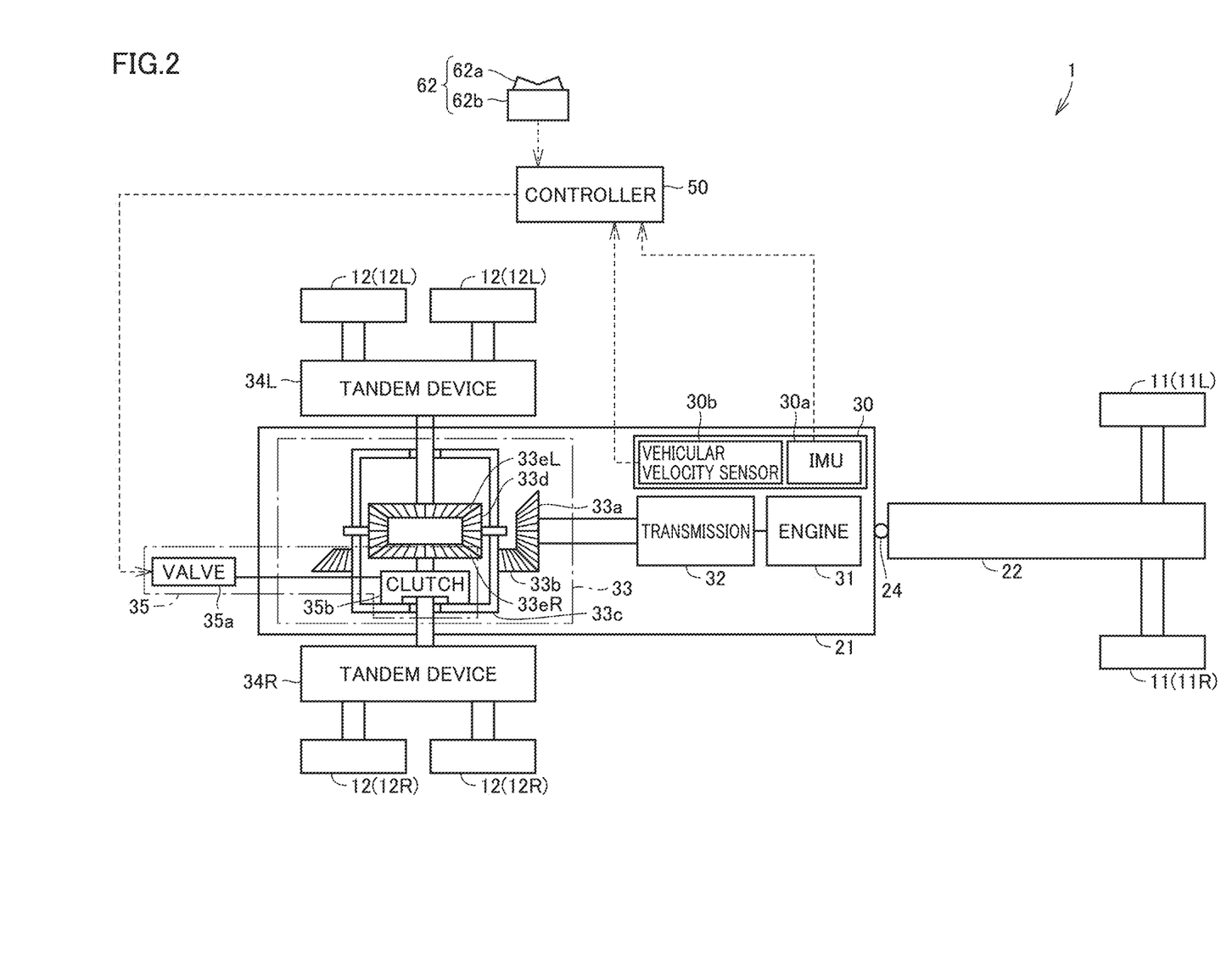
FIG. 2 is a diagram schematically illustrating a drive control configuration of travelling wheels in a motor grader according to an embodiment.

FIG. 2 is a diagram schematically illustrating a drive control configuration of the travelling wheels in the motor grader according to an embodiment. As illustrated in FIG. 2, the motor grader 1 of the present embodiment includes travelling wheels 11 and 12, an engine 31, a transmission 32, a differential device 33, tandem devices 34R and 34L, and a differential control device 35.

The engine 31 is supported on the rear frame 21. The differential device 33 is connected to the engine 31 through the intermediary of the transmission 32. The right tandem device 34R and the left tandem device 34L are respectively connected to the differential device 33 through the intermediary of the differential control device 35.

A pair of right wheels 12R among the four rear wheels 12 is connected to the right tandem device 34R. A pair of left wheels 12L among the four rear wheels 12 is connected to the left tandem device 34L. The engine 31 drives the pair of right wheels 12R and the pair of left wheels 12L through the intermediary of the transmission 32, the differential device 33, the differential control device 35, and the tandem devices 34R and 34L.

The differential device 33 functions to generate a differential motion between a right wheel 12R and a left wheel 12L of the rear wheels 12. The differential device 33 includes a drive pinion gear 33a, a bevel gear 33b, a differential case 33c, a pinion gear 33d, and side gears 33eR and 33eL.

The drive pinion gear 33a is connected to a shaft extending from the transmission 32, and rotates together with the shaft. The bevel gear 33b meshes with the drive pinion gear 33a and is driven to rotate by the drive pinion gear 33a. The differential case 33c is fixed to the bevel gear 33b and rotates together with the bevel gear 33b.

The pinion gear 33d is rotatably supported by the differential case 33c. Each of the side gears 33eR and 33eL meshes with the pinion gear 33d. The side gear 33eR is coupled to a drive shaft connected to the right wheel 12R. The side gear 33eL is coupled to a drive shaft connected to the left wheel 12L.

When the pinion gear 33d transmits power to each of the side gears 33eR and 33eL without rotating relative to the differential case 33c, the right wheel 12R and the left wheel 12L do not rotate differently, i.e., rotate at the same number of revolutions. On the other hand, when the pinion gear 33d transmits power to each of the side gears 33eR and 33eL while rotating relative to the differential case 33c, the right wheel 12R and the left wheel 12L rotate differently, i.e., rotate at different number of revolutions. Thus, the differential device 33 functions to generate a differential motion between the right wheel 12R and the left wheel 12L.

The differential control device 35 functions to prohibit or limit the differential motion between the right wheel 12R and the left wheel 12L. The differential control device 35 may be either a fixed differential (differential locker) or a limited-slip differential (LSD). When the differential control device 35 is a fixed differential, the differential control device 35 functions to prohibit the differential motion between the right wheel 12R and the left wheel 12L. When the differential control device 35 is a limited-slip differential, the differential control device 35 functions to limit the differential motion between the right wheel 12R and the left wheel 12L.

The differential control device 35 includes, for example, a valve 35a and a clutch 35b. The valve 35a controls the flow of pilot oil based on an electrical control signal (an electric pressure control (EPC) current) supplied from the controller 50. The clutch 35b is driven and controlled by the amount (pressure) of pilot oil controlled by the valve 35a. The differential motion between the right wheel 12R and the left wheel 12L is prohibited or limited by the clutch 35b.

When the differential motion between the right wheel 12R and the left wheel 12L is prohibited by the clutch 35b, the driving force is applied to both the right wheel 12R and the left wheel 12L, whereby the number of revolutions of the right wheel 12R is the same as the number of revolutions of the left wheel 12L. When the differential motion between the right wheel 12R and the left wheel 12L is limited by the clutch 35b, the driving force is applied to both the right wheel 12R and the left wheel 12L, whereby the difference in the number of revolutions between the right wheel 12R and the left wheel 12L is smaller than the difference in the number of revolutions without the differential limitation.

The motor grader 1 of the present embodiment further includes a sensor 30, a differential control mode selector 62, and a controller 50. The sensor 30 includes an inertial measurement unit (IMU) 30a and a vehicular velocity sensor 30b.

The IMU 30a detects a turning angular velocity (a rotational (yaw) angular velocity about the vertical axis of the vehicle body) acting on the motor grader 1 when the motor grader 1 is moving (travelling), and generates a signal of the turning angular velocity. The signal of the turning angular velocity generated by the IMU 30a is output to the controller 50.

If the IMU 30a is attached to a portion that moves relative to the body frame 2, such as the work implement 4, the tandem devices 34R, 34L or the like, it is impossible for the IMU 30a to detect the turning angular velocity of the motor grader 1. Therefore, the IMU 30a is attached to the body frame 2 of the motor grader 1 or a portion of the motor grader 1 that does not move relative to the body frame 2.

In order to prevent the IMU 30a from being affected by sands or the like as much as possible, it is preferable to arrange the IMU 30a at a position away from the travelling wheels 11, 12 and the work implement 4. From the viewpoint of preventing the IMU 30a from being affected by sands or the like as much as possible, the IMU 30a is preferably arranged inside the cab 3 as illustrated in FIG. 1, for example. The IMU 30a is preferably arranged on the rear frame 21 instead of the front frame 22.

The vehicular velocity sensor 30b detects a moving velocity (travelling velocity) when the motor grader 1 is moving (travelling), and generates a signal of the travelling velocity. The signal of the travelling velocity generated by the vehicular velocity sensor 30b is output to the controller 50.

The vehicular velocity sensor 30b measures the rotational velocity of an output shaft of the transmission 32, for example. The vehicular velocity sensor 30b may detect the travelling velocity of the motor grader 1 using, for example, GPS (Global Positioning System).

The differential control mode selector 62 is arranged inside the cab 3 illustrated in FIG. 1. The differential control mode selector 62 includes a switch operation member 62a and a switch operation detection unit 62b. The switch operation member 62a is operated by an operator to select a mode from an actuation mode, a cancellation mode, and an automatic differential control mode. The switch operation detection unit 62b detects the mode selected by the switch operation member 62a from the actuation mode, the cancellation mode, and the automatic differential control mode. The switch operation detection unit 62b outputs a detection signal indicating the selected mode to the controller 50.

In the actuation mode, the differential control device 35 is actuated to perform the differential prohibition or limitation. Therefore, in the actuation mode, the number of revolutions of the right wheel 12R is the same as the number of revolutions of the left wheel 12L, or the difference in the number of revolutions between the right wheel 12R and the left wheel 12L is smaller than the difference in the number of revolutions without the differential limitation.

In the cancellation mode, the differential control device 35 is controlled to cancel the differential prohibition or limitation. Therefore, in the cancellation mode, the right wheel 12R and the left wheel 12L rotate differently, and the number of revolutions of the right wheel 12R is different from the number of revolutions of the left wheel 12L in response to the resistance on the right wheel 12R and the left wheel 12L, respectively.

In the automatic differential control mode, the differential control device 35 is controlled to automatically perform the differential prohibition or limitation. The method of controlling the differential prohibition or limitation in the automatic differential control mode will be described later.

<Configuration of Controller 50>

Next, the configuration of the controller 50 in the embodiment will be described with reference to FIG. 3.

Figure 3:
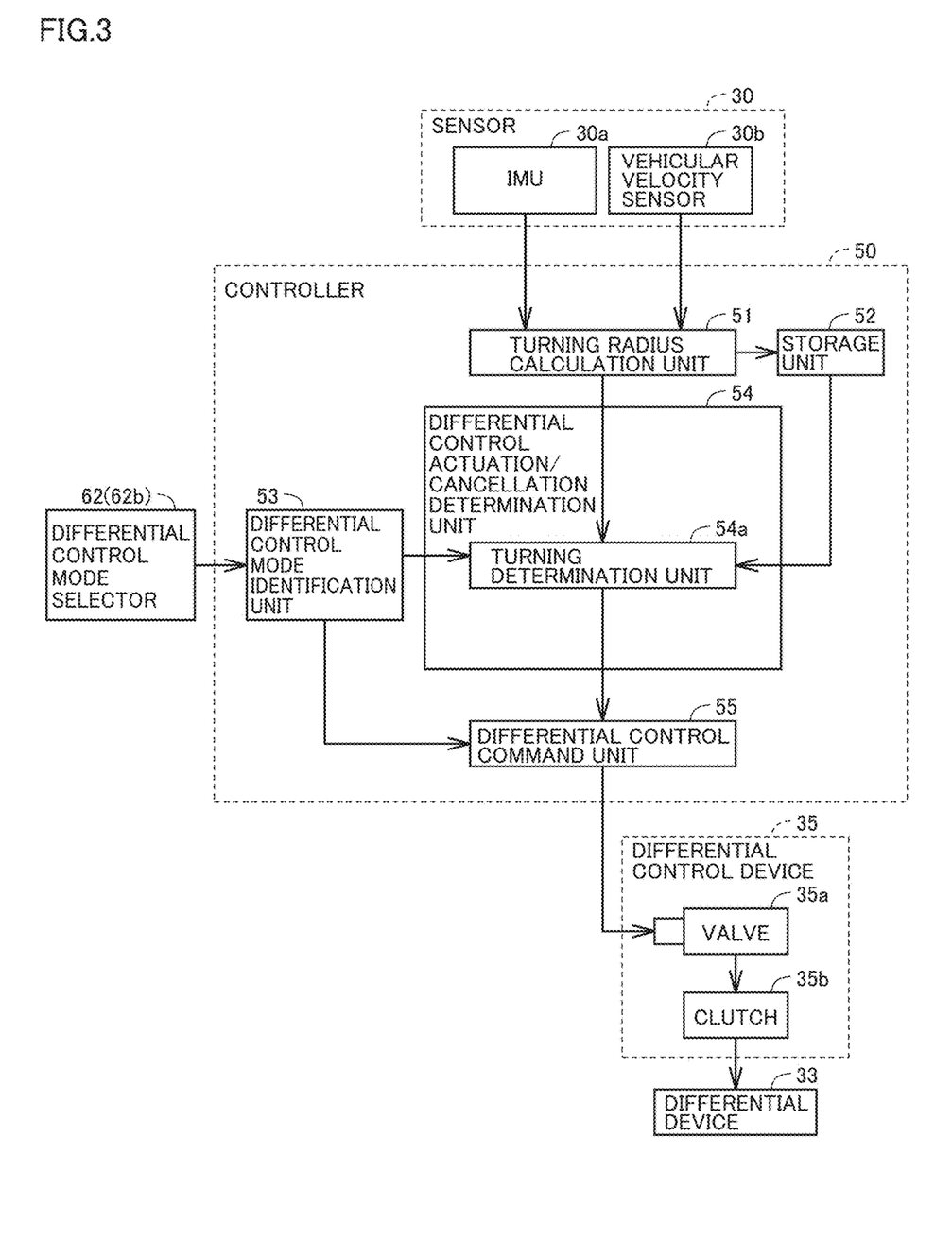
FIG. 3 is a functional block diagram illustrating functions of a controller in a motor grader according to an embodiment.

FIG. 3 is a functional block diagram illustrating functions of the controller 50 in the motor grader 1 according to the embodiment. As illustrated in FIG. 3, the controller 50 determines the turning motion of the motor grader 1 based on the turning angular velocity detected by the sensor 30, and controls the differential control device 35 to perform the differential prohibition or limitation during the turning motion.

Further, the controller 50 calculates the turning radius of the motor grader 1 based on the turning angular velocity and the travelling velocity of the motor grader 1 detected by the sensor 30, and based on the calculated turning radius, the controller 50 controls the differential control device 35 to perform the differential prohibition or limitation.

Furthermore, the controller 50 determines the turning motion by comparing the calculated turning radius with a threshold stored in the storage unit 52, and based on the comparison result, the controller 50 controls the differential control device 35 to perform the differential prohibition or limitation.

Based on the determination result that the calculated turning radius is equal to or less than a first threshold, the controller 50 controls the differential control device 35 to cancel the differential prohibition or limitation. The first threshold is, for example, a turning radius when a steering angle β of the motor grader 1 is ½ of a maximum steering angle.

Based on the determination result that the calculated turning radius is equal to or less than a second threshold, the controller 50 controls the differential control device 35 to cancel the differential prohibition or limitation. The second threshold is, for example, a turning radius when an articulation angle α of the motor grader 1 is ½ of a maximum articulation angle.

Based on the determination result that the calculated turning radius is less than a third threshold, the controller 50 controls the differential control device 35 to perform the differential prohibition or limitation. The third threshold is, for example, a minimum turning radius of the motor grader 1.

The controller 50 calculates the turning radius of the motor grader 1 after the differential control mode selector 62 is switched to any mode among the actuation mode, the cancellation mode and the automatic differential control mode.

A specific configuration of the controller 50 will be described hereinafter.

As illustrated in FIG. 3, the controller 50 includes a turning radius calculation unit 51, a storage unit 52, a differential control mode identification unit 53, a differential control device actuation/cancellation determination unit 54, and a differential control command unit 55.

The turning radius calculation unit 51 calculates a turning radius R (=v/w) for a center of the rear wheels 12 based on a turning angular velocity ω detected by the IMU 30a and a travelling velocity v of the motor grader 1 detected by the vehicular velocity sensor 30b. The turning radius calculation unit 51 outputs the calculated turning radius R to the actuation/cancellation determination unit 54 or the storage unit 52.

Figure 5:
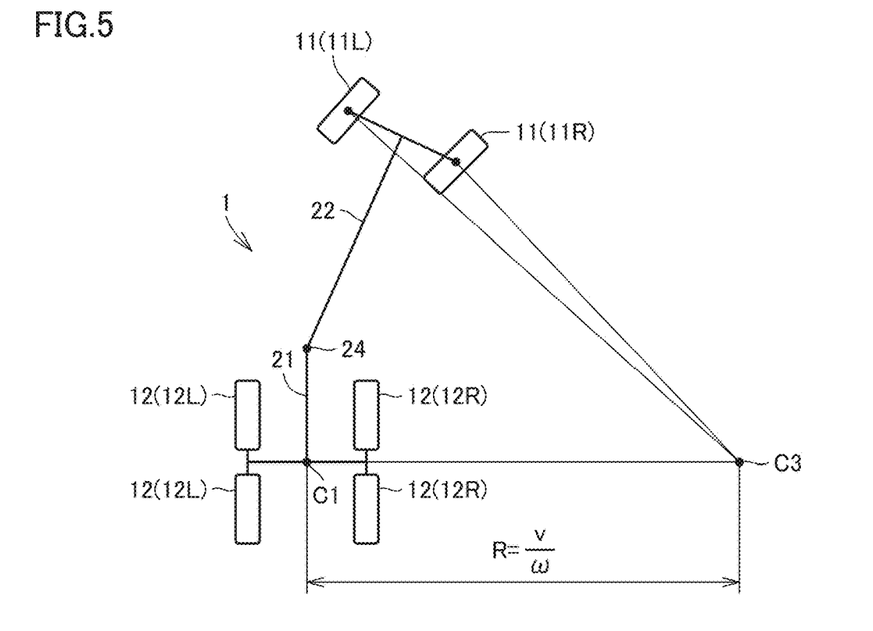
FIG. 5 is a diagram illustrating a turning radius.

As illustrated in FIG. 5, the turning radius for a center of the rear wheel 12 refers to a turning radius for a center (rear wheel center) Cl between the pair of right wheels 12R and the pair of left wheels 12L which constitute the rear wheels 12.

As illustrated in FIG. 3, when the turning radius R is output from the turning radius calculation unit 51 to the storage unit 52, the storage unit 52 stores the turning radius R. In addition, the storage unit 52 stores a threshold for determining whether or not to allow the differential control device 35 to perform or cancel the differential prohibition or limitation, which will be described later. The storage unit 52 may store a turning radius in the half steering of the motor grader 1 and a minimum turning radius (third threshold) as the thresholds, for example.

For example, the storage unit 52 stores a turning radius (first threshold) when the steering angle β (see FIG. 6) is ½ of the maximum steering angle or a turning radius (second threshold) when the articulation angle α (see FIG. 6) is ½ of the maximum articulation angle as the turning radius in the half steering of the motor grader 1. Further, the storage unit 52 may store a turning radius when the steering angle β is ½ of the maximum steering angle and the articulation angle α is ½ of the maximum articulation angle as the turning radius in the half steering of the motor grader 1, for example. Furthermore, the storage unit 52 may store a turning radius of 15 m as the turning radius of the motor grader 1 in the half steering, for example.

For example, the storage unit 52 may store a turning radius when the steering angle β is maximum and the articulation angle α is maximum as the minimum turning radius of the motor grader 1. For example, the storage unit 52 may store a turning radius of 4.5 m as the minimum turning radius of the motor grader 1.

Figure 6:
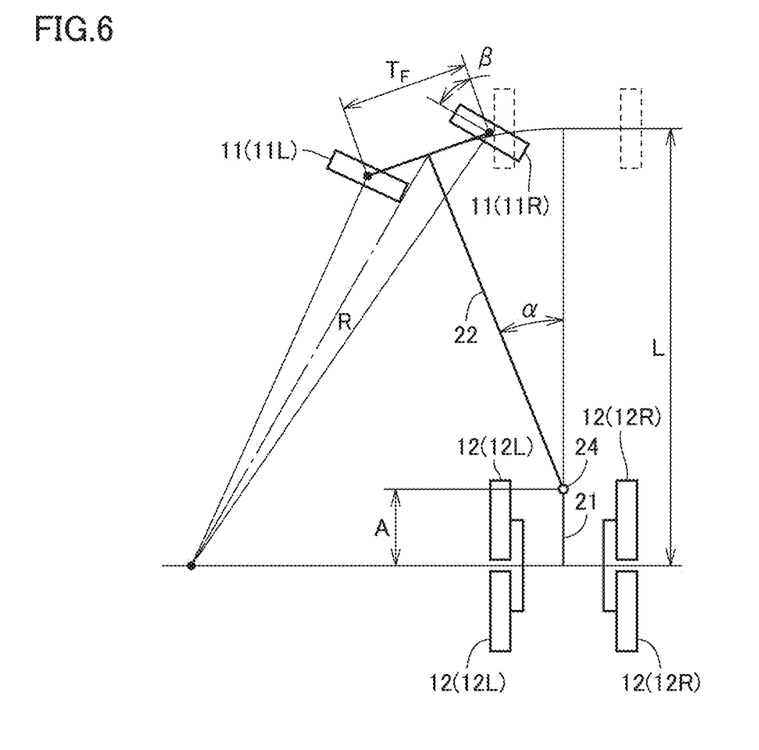
FIG. 6 is a diagram illustrating a calculation formula for calculating a turning radius of front wheels.

The maximum value of the steering angle β refers to a maximum steering angle which causes the front wheels 11 to make a maximum turning from the linear travelling state as illustrated in FIG. 6. The maximum value of the articulation angle α refers to a maximum articulation angle which causes the front frame 22 to make a maximum pivoting with respect to the rear frame 21 from the linear travelling state as illustrated in FIG. 6.

The turning radius and the minimum turning radius in the half steering of the motor grader 1 each may be calculated according to the following equation:

$$R = \sqrt{\left(\frac{A + (L-A)\cos\alpha}{\tan(\alpha + \beta)} + \frac{T_F}{2}\cos\alpha\right)^2 + \left(A + (L-A)\cos\alpha + \frac{T_F}{2}\sin\alpha\right)^2}$$

With reference to FIG. 6, in the above equation, R represents a turning radius (unit: m); A represents a distance (unit: m) between the articulation pin 24 and the center of the drive shaft of the rear wheels 12; L represents a wheel base (unit: m); α represents an articulation angle (unit: radian); β represents a steering angle (unit: radian); and $T_F$ represents a wheel track (unit: m) between the front wheels 11. A, L and $T_F$ are stored in the storage unit 52.

In order to calculate a turning radius in the half steering of the motor grader 1 from the above equation, β is substituted by ½ of the maximum steering angle, and a is substituted by 0. Alternatively, in order to calculate a turning radius in the half steering of the motor grader 1 from the above equation, α may be substituted by ½ of the maximum articulation angle, and β may be substituted by 0.

Alternatively, in order to calculate a turning radius in the half steering of the motor grader 1 from the above equation, β may be substituted by ½ of the maximum steering angle, and α may be substituted by ½ of the maximum articulation angle.

In order to calculate the minimum turning radius of the motor grader 1 from the above equation, β is substituted by ½ of the maximum steering angle, and α is substituted by ½ of the maximum articulation angle.

The threshold or the like may be stored in advance in the storage unit 52 at the shipment of the motor grader 1 or may be input from an external device and stored in the storage unit 52 after the shipment. The threshold may be stored in the storage unit 52 via wireless communication or wired communication with an external device. The threshold may be stored in the storage unit 52 by directly connecting another storage medium to the storage unit 52.

The differential control mode identification unit 53 receives the detection signal output from the switch operation detection unit 62b of the differential control mode selector 62, and identifies the mode selected by the differential control mode selector 62. Specifically, the differential control mode identification unit 53 identifies the mode selected from the actuation mode, the cancellation mode, and the automatic differential control mode by the differential control mode selector 62.

After identifying the mode (the actuation mode, the cancellation mode, or the automatic differential control mode) selected by the differential control mode selector 62, the differential control mode identification unit 53 outputs a signal of the identified mode to the differential control command unit 55 or the actuation/cancellation determination unit 54.

If the differential control mode identification unit 53 identifies that the mode is the actuation mode, the differential control mode identification unit 53 outputs an identification signal of the actuation mode to the differential control command unit 55. Upon receiving the identification signal of the actuation mode, the differential control command unit 55 outputs a control signal to the differential control device 35, which causes the differential control device 35 to perform the differential prohibition or limitation.

If the differential control mode identification unit 53 identifies that the mode is the cancellation mode, the differential control mode identification unit 53 outputs an identification signal of the cancellation mode to the differential control command unit 55. Upon receiving the identification signal of the cancellation mode, the differential control command unit 55 outputs a control signal to the differential control device 35, which causes the differential control device 35 to cancel the differential prohibition or limitation.

If the differential control mode identification unit 53 identifies that the mode is the automatic differential control mode, the differential control mode identification unit 53 outputs an identification signal of the automatic differential control mode to the actuation/cancellation determination unit 54. Upon receiving the identification signal of the automatic differential control mode, the actuation/removal determination unit 54 determines whether or not to allow the differential control device 35 to perform or cancel the differential prohibition or limitation, and outputs a signal indicating the determination result to the differential control command unit 55.

When actuation/cancellation determination unit 54 determines whether or not to allow the differential control device 35 to perform or cancel the differential prohibition or limitation, it also determines whether or not the motor grader 1 is turning. Therefore, the actuation/cancellation determination unit 54 includes a turning determination unit 54a.

Upon receiving the identification signal of the automatic differential control mode from the differential control mode identification unit 53, the turning determination unit 54a determines whether or not the motor grader 1 is turning. The controller 50 calculates the turning radius after each mode is selected from the actuation mode, the cancellation mode, and the automatic differential control mode by the differential control mode selector 62.

The turning determination unit 54a determines whether or not the motor grader 1 is turning based on, for example, whether or not the turning radius calculated by the turning radius calculation unit 51 is equal to or greater than the minimum turning radius of the motor grader 1 and equal to or less than the turning radius in the half steering.

In the present disclosure, if the turning radius is equal to or greater than the minimum turning radius of the motor grader 1 and equal to or less than the turning radius in the half steering, the motor grader 1 is in a steady turning state. If the turning radius is less than the minimum turning radius of the motor grader 1, the motor grader 1 is in a spinning or oversteering state.

Whether or not the turning radius is equal to or less than the turning radius in the half steering of the motor grader 1 is determined by comparing, for example, whether or not the turning radius calculated by the turning radius calculation unit 51 is equal to or less than the turning radius when the steering angle β is ½ of the maximum steering angle. If the turning radius calculated by the turning radius calculation unit 51 is equal to or less than the turning radius when the steering angle β is ½ of the maximum steering angle, it is determined that the turning radius is equal to or less than the turning radius in the half steering.

Alternatively, whether or not the turning radius is equal to or less than the turning radius in the half steering of the motor grader 1 may be determined by comparing, for example, whether or not the turning radius calculated by the turning radius calculation unit 51 is equal to or less than the turning radius when the articulation angle α is ½ of the maximum articulation angle. If the turning radius calculated by the turning radius calculation unit 51 is equal to or less than the turning radius when the articulation angle α is ½ of the maximum articulation angle, it is determined that the turning radius is equal to or less than the turning radius in the half steering.

Alternatively, whether or not the turning radius is equal to or less than the turning radius in the half steering of the motor grader 1 may be determined by comparing, for example, whether or not the turning radius calculated by the turning radius calculation unit 51 is equal to or less than the turning radius when the steering angle β is ½ of the maximum steering angle and is equal to or less than the turning radius when the articulation angle α is ½ of the maximum articulation angle. If the turning radius calculated by the turning radius calculation unit 51 is equal to or less than the turning radius when the steering angle β is ½ of the maximum steering angle and is equal to or less than the turning radius when the articulation angle α is ½ of the maximum articulation angle, it is determined that the turning radius is equal to less than the turning radius in the half steering.

Alternatively, whether or not the turning radius is equal to or less than the turning radius in the half steering of the motor grader 1 may be determined by comparing whether or not the turning radius calculated by the turning radius calculation unit 51 is equal to or less than 15 m, for example. If the turning radius calculated by the turning radius calculation unit 51 is equal to or less than 15 m, it is determined that the turning radius is equal to less than the turning radius in the half steering.

The turning determination unit 54a may use the turning radius in the half steering stored in the storage unit 52 to perform the determination mentioned above. The turning determination unit 54a may use at least one of the turning radius when the steering angle β is ½ of the maximum steering angle and the turning radius when the articulation angle α is ½ of the maximum articulation angle which are stored in the storage unit 52 to perform the determination mentioned above. The turning determination unit 54a may use the turning radius of 15 m stored in the storage unit 52, for example, to perform the determination mentioned above.

If it is determined that the turning radius is not equal to or less than the turning radius in the half steering of the motor grader 1 for a predetermined time (for example, 0.5 seconds), the turning determination unit 54a outputs a determination signal to the differential control command unit 55.

Upon receiving the determination signal, the differential control command unit 55 outputs a control signal to the differential control device 35 so as to allow the differential control device 35 to perform the differential prohibition or limitation.

If it is determined that the turning radius is equal to or less than the turning radius in the half steering of the motor grader 1 for a predetermined time (for example, 0.5 seconds), then the turning determination unit 54a determines whether or not the turning radius is less than the minimum turning radius of the motor grader 1.

Whether or not the turning radius is less than the minimum turning radius of the motor grader 1 may be determined by comparing whether or not the turning radius calculated by the turning radius calculation unit 51 is less than the turning radius when both the steering angle β and the articulation angle α are maximum, for example.

If the turning radius calculated by the turning radius calculation unit 51 is less than the turning radius when both the steering angle β and the articulation angle α are maximum, it is determined that the turning radius is less than the minimum turning radius of the motor grader 1.

Alternatively, whether or not the turning radius is less than the minimum turning radius of the motor grader 1 may be determined by comparing whether or not the turning radius calculated by the turning radius calculation unit 51 is less than 4.5 m, for example.

If the turning radius calculated by the turning radius calculation unit 51 is less than 4.5 m, it is determined that the turning radius is less than the minimum turning radius of the motor grader 1.

The turning determination unit 54a may use the minimum turning radius of the motor grader 1 stored in the storage unit 52 to perform the determination mentioned above. The turning determination unit 54a may use the turning radius of 4.5 m stored in the storage unit 52, for example, to perform the determination mentioned above.

If it is determined that the turning radius is less than the minimum turning radius of the motor grader 1 for a predetermined time (for example, 0.5 seconds), the turning determination unit 54a outputs a determination signal to the differential control command unit 55.

Upon receiving the determination signal, the differential control command unit 55 outputs a control signal (actuation signal) to the differential control device 35, which causes the differential control device 35 to perform the differential prohibition or limitation.

If it is determined that the state in which the turning radius is less than the minimum turning radius of the motor grader 1 is not continued for a predetermined time (for example, 0.5 seconds), the turning determination unit 54a outputs a determination signal to the differential control command unit 55.

Upon receiving the determination signal, the differential control command unit 55 outputs a control signal (cancellation signal) to the differential control device 35, which causes the differential control device 35 to cancel the differential prohibition or limitation.

When the differential control device 35 receives the actuation signal from the differential control command unit 55, the valve 35a controls the operation of the clutch 35b, whereby the differential control is turned ON. The differential control ON state refers to a state in which the differential control device 35 is controlled to perform the differential prohibition or limitation. In this state, the differential motion between the right wheel 12R and the left wheel 12L is limited or prohibited by the differential control device 35.

When the differential control device 35 receives an cancellation signal from the differential control command unit 55, the valve 35a controls the operation of the clutch 35b, whereby the differential control is turned OFF. The differential control OFF state refers to a state in which the differential control device 35 is controlled to cancel the differential prohibition or limitation. In this state, the differential motion between the right wheel 12R and the left wheel 12L is not prohibited or limited by the differential control device 35.

As described above, the controller 50 determines the turning motion of the motor grader 1 based on the turning angular velocity detected by the sensor 30, and controls the differential control device 35 to perform the differential prohibition or limitation operation during the turning motion.

<Travelling Control Method>

Next, a travelling control method according to an embodiment will be described with reference to FIGS. 3 and 4.

Figure 4:
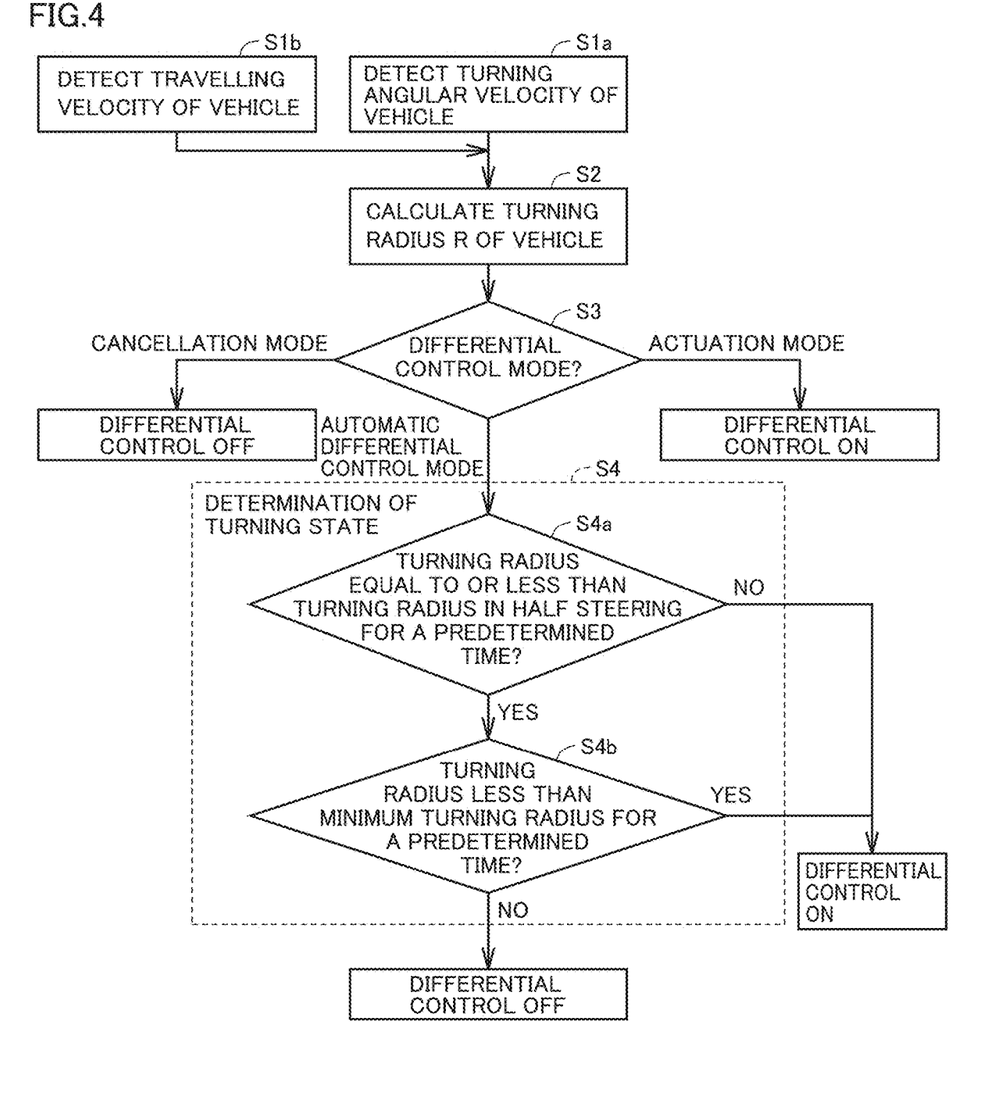
FIG. 4 is a flowchart illustrating a method of controlling the travelling of a motor grader according to an embodiment.

FIG. 4 is a flowchart illustrating a method of controlling travelling wheels of the motor grader according to an embodiment. As illustrated in FIGS. 3 and 4, a turning angular velocity ω of the motor grader 1 is detected by the sensor 30 (IMU 30a) (step S1a: FIG. 4). A travelling velocity v of the motor grader 1 is detected by the sensor 30 (vehicular velocity sensor 30b) (step S1b: FIG. 4). The travelling velocity v of the motor grader 1 may be detected by the IMU 30a.

The turning radius calculation unit 51 of the controller 50 calculates the turning radius R from the detected turning angular velocity ω and the detected travelling velocity v (step S2: FIG. 4). The turning radius R is calculated by dividing the travelling velocity v by the turning angular velocity ω.

The differential control mode identification unit 53 identifies which mode is selected by the differential control mode selector 62 (step S3: FIG. 4). The differential control mode identification unit 53 identifies the mode selected from the actuation mode, the cancellation mode and the automatic differential control mode.

If the differential control mode identification unit 53 identifies that the mode is the actuation mode, the differential control device 35 is brought into the differential control ON state. If the differential control mode identification unit 53 identifies that the mode is the cancellation mode, the differential control device 35 is brought into the differential control OFF state.

If the differential control mode identification unit 53 identifies that the mode is the automatic differential control mode, the actuation/cancellation determination unit 54, upon receiving the identification signal of the automatic differential control mode, determines the turning motion of the motor grader 1 based on the turning angular velocity detected as described above, and controls the differential prohibition or limitation on the right wheel 12R and the left wheel 12L during the turning motion (step S4: FIG. 4).

At the time of determining whether or not to allow the differential control device 35 to perform or cancel the differential prohibition or limitation function, the actuation/cancellation determination unit 54 determines whether or not the motor grader 1 is turning (step S4: FIG. 4).

In the determination of the turning state, first, the actuation/cancellation determination unit 54 determines whether or not the turning radius is equal to or less than the turning radius in the half steering for a predetermined time (for example, 0.5 seconds) (step S4a: FIG. 4).

Whether or not the turning radius is equal to or less than the turning radius in the half steering of the motor grader 1 is determined by comparing whether or not the turning radius calculated by the turning radius calculation unit 51 is equal to or less than the turning radius when the turning radius is, for example, ½ of a maximum steering angle β. If the turning radius R calculated by the turning radius calculation unit 51 is equal to or less than the turning radius when the steering angle β is ½ of the maximum steering angle, it is determined that the turning radius is equal to or less than the turning radius in the half steering. On the other hand, if the turning radius R calculated by the turning radius calculation unit 51 is larger than the turning radius when the steering angle β is ½ of the maximum steering angle, it is determined that the turning radius is not less than the turning radius in the half steering.

Alternatively, whether or not the turning radius is equal to or less than the turning radius in the half steering of the motor grader 1 may be determined by comparing, for example, whether or not the turning radius calculated by the turning radius calculation unit 51 is equal to or less than the turning radius when the articulation angle α is ½ of the maximum articulation angle. If the turning radius calculated by the turning radius calculation unit 51 is equal to or less than the turning radius when the articulation angle α is ½ of the maximum articulation angle, it is determined that the turning radius is equal to or less than the turning radius in the half steering. On the other hand, if the turning radius R calculated by the turning radius calculation unit 51 is greater than the turning radius when the articulation angle α is ½ of the maximum articulation angle, it is determined that the turning radius is not less than the turning radius in the half steering.

Alternatively, whether or not the turning radius is equal to or less than the turning radius in the half steering of the motor grader 1 may be determined by comparing, for example, whether or not the turning radius calculated by the turning radius calculation unit 51 is equal to or less than the turning radius when the steering angle β is ½ of the maximum steering angle and is equal to or less than the turning radius when the articulation angle α is ½ of the maximum articulation angle.

Alternatively, whether or not the turning radius is equal to or less than the turning radius in the half steering of the motor grader 1 may be determined by comparing whether or not the turning radius calculated by the turning radius calculation unit 51 is equal to or less than 15 m, for example. If the turning radius calculated by the turning radius calculation unit 51 is equal to or less than 15 m, it is determined that the turning radius is equal to less than the turning radius in the half steering. On the other hand, if the turning radius calculated by the turning radius calculation unit 51 is greater than 15 m, it is determined that the turning radius is not less than or equal to the turning radius in the half steering.

If it is determined that the turning radius is not equal to or less than the turning radius in the half steering for a predetermined time (for example, 0.5 seconds), the differential prohibition or limitation by the differential control device 35 is turned ON (differential control ON state).

If it is determined that the turning radius is equal to or less than the turning radius in the half steering for a predetermined time, whether or not the turning radius calculated by the turning radius calculation unit 51 is less than the minimum turning radius for a predetermined time (for example, 0.5 seconds) is determined (step S4b: FIG. 4).

Whether or not the turning radius is less than the minimum turning radius of the motor grader 1 may be determined by comparing whether or not the turning radius calculated by the turning radius calculation unit 51 is less than the turning radius when both the steering angle β and the articulation angle α are maximum. If the turning radius calculated by the turning radius calculation unit 51 is less than the turning radius when both the steering angle β and the articulation angle α are maximum, it is determined that the turning radius is less than the minimum turning radius of the motor grader 1. If the turning radius R calculated by the turning radius calculation unit 51 is equal to or greater than the turning radius when both the steering angle β and the articulation angle α are maximum, it is determined that the turning radius is not less than the minimum turning radius.

If it is determined that the turning radius is less than the minimum turning radius for a predetermined time (for example, 0.5 seconds), the differential prohibition or limitation function of the differential control device 35 is turn ON (differential control ON state).

If it is determined in the above that the turning radius is not less than the minimum turning radius for a predetermined time, the differential prohibition or limitation function of the differential control device 35 is turned OFF (differential control OFF state), which makes it possible to easily get out of the slippage during the turning motion.

<Effect in the Present Embodiment>

In the present embodiment, as illustrated in FIG. 3, the controller 50 determines the turning motion of the motor grader 1 based on the turning angular velocity detected by the sensor 30, and controls the differential control device 35 to perform the differential prohibition or limitation during the turning motion. If the controller 50 determines that either the right wheel 12R or the left wheel 12L of the rear wheels 12 slips during the turning motion, for example, the controller 50 may control the differential control device 35 to perform the differential prohibition or limitation. Therefore, even if one of the right wheel 12R and the left wheel 12L is rotating idly due to the slippage, the driving force may be transmitted to the other wheel that is in contact with the ground, which makes it possible to easily get out of the slippage.

Further, when the rear wheels 12 are in a steady turning state without slipping during the turning motion, the controller 50 may cancel (disable) the differential prohibition or limitation function of the differential control device 35. Thus, during the normal turning motion, the differential device 33 may increase the number of revolutions of an outer wheel greater than the number of revolutions of an inner wheel during the turning motion. Therefore, it is possible to prevent the wheels from being worn out unnecessarily, and prevent the drive shaft from suffering from any unnecessary load, or the like.

The turning angular velocity of the motor grader 1 may be measured by the IMU 30a of the sensor 30, for example. Generally, the IMU 30a is capable of measuring the turning angular velocity of the motor grader 1 even though it is attached to any position of the motor grader 1. Therefore, the IMU 30a may be arranged at a position away from the travelling wheels 11, 12 and the work implement 4 (for example, inside the cab 3) so as to prevent the IMU 30a from being affected by sands or the like as much as possible, which makes it possible to protect the IMU 30a from any possible damage.

In the above embodiment, as illustrated in FIG. 3, the controller 50 calculates a turning radius based on the turning angular velocity and the travelling velocity detected by the sensor 30, and based on the calculated turning radius, the controller 50 controls the differential control device 35 to perform the differential prohibition or limitation. Thus, the turning radius may be calculated based on the turning angular velocity.

In the above embodiment, as illustrated in FIG. 3, the controller 50 determines the turning motion by comparing the turning radius calculated by the turning radius calculation unit 51 with the threshold stored in the storage unit 52, and based on the comparison result, the controller 50 controls the differential control device 35 to perform the differential prohibition or limitation. This enables the turning motion to be determined.

In the above embodiment, as illustrated in FIG. 3, the threshold stored in the storage unit 52 includes a first threshold. The first threshold is a turning radius of the motor grader 1 when the steering angle β of the motor grader 1 is ½ of the maximum steering angle. Based on the determination result that the turning radius calculated by the turning radius calculation unit 51 is equal to or less than the first threshold, the controller 50 controls the differential control device 35 to cancel the differential prohibition or limitation. Thus, when it is determined that the vehicle is turning, the differential control device 35 is controlled to cancel the differential prohibition or limitation, and thereby, the number of revolutions of an outer wheel may be made greater than the number of revolutions of an inner wheel during the turning motion. Therefore, it is possible to prevent the wheels from being worn out unnecessarily, prevent the drive shaft from suffering from any unnecessary load, or the like.

In the above embodiment, as illustrated in FIG. 3, the threshold stored in the storage unit 52 includes a second threshold. The second threshold is a turning radius of the motor grader 1 when the articulation angle α of the motor grader 1 is ½ of the maximum articulation angle. Based on the determination result that the turning radius calculated by the turning radius calculation unit 51 is equal to or less than the second threshold, the controller 50 controls the differential control device 35 to cancel the differential prohibition or limitation. Thus, when it is determined that the vehicle is turning, the differential control device 35 is controlled to cancel the differential prohibition or limitation, and thereby, the number of revolutions of the outer wheel may be made greater than the number of revolutions of the inner wheel during the turning motion. Therefore, it is possible to prevent the wheels from being worn out unnecessarily, prevent the drive shaft from suffering from any unnecessary load, or the like.

In the above embodiment, as illustrated in FIG. 3, the threshold stored in the storage unit 52 includes a third threshold. The third threshold is the minimum turning radius of the motor grader 1. Based on the determination result that the turning radius calculated by the turning radius calculation unit 51 is equal to or greater than the third threshold, the controller 50 controls the differential control device 35 to cancel the differential prohibition or limitation. Thus, when it is determined that the vehicle is turning, the differential control device 35 is controlled to cancel the differential prohibition or limitation, and thereby, the number of revolutions of the outer wheel may be made greater than the number of revolutions of the inner wheel during the turning motion. Therefore, it is possible to prevent the wheels from being worn out unnecessarily, prevent the drive shaft from suffering from any unnecessary load, or the like.

In the above embodiment, as illustrated in FIG. 3, the controller 50 may calculate the turning radius after a mode is selected by the differential control mode selector 62 from the actuation mode, the cancellation mode, and the automatic differential control mode. Thus, it is possible to obtain the turning radius in each mode.

Although the control of the right wheel 12R and the left wheel 12L of the rear wheels 12 has been described in the above embodiment, the present disclosure may be applied to the right front wheel 11R and the left front wheel 11L as long as they are drive wheels.

Although the motor grader 1 has been described as an example of a work machine in the above embodiment, the present disclosure is also applicable to an articulating dump, a rigid dump, and a wheel loader.

It should be understood that the embodiments and the examples disclosed herein have been presented for the purpose of illustration and description but not restricted in all aspects. It is intended that the scope of the present invention is not limited to the description above but defined by the scope of the claims and encompasses all modifications equivalent in meaning and scope to the claims.

REFERENCE SIGNS LIST

1: motor grader; 2: body frame; 2F: front end; 2R: rear end; 3: cab; 4: work implement; 6: engine compartment; 7: steering cylinder; 11: front wheel; 11L: left front wheel; 11R: right front wheel; 12: rear wheel; 12L: left rear wheel; 12R: right rear wheel; 21: rear frame; 22: front frame; 23: articulation cylinder; 24: center pin; 25: exterior cover; 26: counterweight; 30: sensor; 30b: vehicular velocity sensor; 31: engine; 32: transmission; 33: differential device; 33a: drive pinion gear; 33b: bevel gear; 33c: differential case; 33d: pinion gear; 33eL, 33eR: side gear; 34L: left tandem device; 34R: right tandem device; 35: differential control device; 35a: valve; 35b: clutch; 40: draw bar; 41: swing circle; 42: blade; 44: lift cylinder; 49: hydraulic motor; 50: controller; 51: turning radius calculation unit; 52: storage unit; 53: differential control mode identification unit; 54: actuation/cancellation determination unit; 54a: turning determination unit; 54b: slippage determination unit; 55: differential control command unit; 62: differential control mode selector; 62a: switch operation member; 62b: switch operation detection unit

The invention claimed is:

1. A work machine comprising:
   a differential device;
   a differential control device that prohibits or limits a differential motion generated by the differential device;
   a sensor that detects a turning angular velocity and a travelling velocity of the work machine; and
   a controller that
      calculates a turning radius based on the turning angular velocity and the travelling velocity detected by the sensor,
      determines a turning motion by comparing the calculated turning radius with a threshold, and
      based on the comparison result, controls the differential control device to perform the differential prohibition or limitation,
   wherein determining a turning motion by comparing the calculated turning radius with a threshold includes (i) comparing the calculated turning radius with a prestored turning radius in half steering and (ii) comparing the calculated turning radius with a minimum turning radius, and
   wherein the differential motion is prohibited or limited if the calculated turning radius is equal to or less than the prestored turning radius in half steering for a first predetermined period of time and the turning radius is not less than the minimum turning radius for a second predetermined period of time.

2. The work machine according to claim 1, wherein comparing the calculated turning radius with a prestored turning radius in half steering includes comparing the calculated turning radius with a turning radius of the work machine when a steering angle of the work machine is ½ of a maximum steering angle.

3. The work machine according to claim 1, wherein comparing the calculated turning radius with a prestored turning radius in half steering includes comparing the calculated turning radius with a turning radius of the work machine when an articulation angle of the work machine is ½ of a maximum articulation angle.

4. The work machine according to claim 1, further comprising:
   a selector capable of switching between an actuation mode in which the differential control device is actuated to perform the differential prohibition or limitation, a cancellation mode in which the differential control device is controlled to cancel the differential prohibition or limitation, and an automatic differential control mode in which the differential control device automatically performs the differential prohibition or limitation, and
   the controller calculates the turning radius after the selector is switched to any mode among the actuation mode, the cancellation mode and the automatic differential control mode.

5. A control method of a work machine equipped with a right wheel and a left wheel, the control method comprising:
   detecting a turning angular velocity of the work machine;
   detecting a travelling velocity of the work machine;
   calculating a turning radius based on the detected turning angular velocity and the detected travelling velocity;
   determining a turning motion by comparing the calculated turning radius with a threshold, and
   prohibiting or limiting a differential motion between the right wheel and the left wheel based on the comparison result,
   wherein determining a turning motion by comparing the calculated turning radius with a threshold includes (i) comparing the calculated turning radius with a prestored turning radius in half steering and (ii) comparing the calculated turning radius with a minimum turning radius, and
   wherein the differential motion is prohibited or limited if the calculated turning radius is equal to or less than a prestored turning radius in half steering for a first predetermined period of time and the turning radius is not less than a minimum turning radius for a second predetermined period of time.

* * * * *